(12) United States Patent
Duesselberg

(10) Patent No.: US 7,940,025 B2
(45) Date of Patent: May 10, 2011

(54) DEVICE FOR LOCKING A POWER TOOL TO A BATTERY PACK, AND BATTERY PACK

(75) Inventor: Achim Duesselberg, Hangzhou (CN)

(73) Assignee: Robert Bosch GmbH, Stuttgart (DE)

( * ) Notice: Subject to any disclaimer, the term of this patent is extended or adjusted under 35 U.S.C. 154(b) by 1375 days.

(21) Appl. No.: 11/220,105

(22) Filed: Sep. 6, 2005

(65) Prior Publication Data
US 2006/0055370 A1 Mar. 16, 2006

(30) Foreign Application Priority Data
Sep. 10, 2004 (DE) .......................... 10 2004 043 821

(51) Int. Cl.
H02J 7/00 (2006.01)
B25G 3/00 (2006.01)
F16B 7/10 (2006.01)
H01M 2/10 (2006.01)
(52) U.S. Cl. ............... 320/112; 429/97; 429/99; 429/96
(58) Field of Classification Search .................. 320/112, 320/114, 107; 429/96, 97, 160; 439/341; 361/679, 732; 403/331, 109.8, 187; 70/61, 106; 292/137, 163, 169, 175, 302, 254, 10, 17

See application file for complete search history.

(56) References Cited

U.S. PATENT DOCUMENTS

| 2003/0071598 A1* | 4/2003 | Kubale et al. ................. 320/107 |
| 2004/0070367 A1* | 4/2004 | Schadoffsky et al. ........ 320/107 |
| 2004/0081883 A1* | 4/2004 | Mooty et al. ................... 429/96 |
| 2004/0192106 A1 | 9/2004 | Britz |

FOREIGN PATENT DOCUMENTS

| EP | 1481769 | 12/2004 |
| GB | 2302051 | 1/1997 |

* cited by examiner

Primary Examiner — Edward Tso
Assistant Examiner — Alexis Boateng
(74) Attorney, Agent, or Firm — Michael J. Striker

(57) ABSTRACT

A device for locking a power tool to a battery pack has at least one movable locking bar mountable on the power tool and upon locking engaging a detent recess of the battery pack, and at least one unlocking device for manually disengaging the locking bar from the detent recess, wherein the unlocking device is mountable on the battery pack.

11 Claims, 2 Drawing Sheets

DEVICE FOR LOCKING A POWER TOOL TO A BATTERY PACK, AND BATTERY PACK

CROSS-REFERENCE

The invention described and claimed hereinbelow is also described in German Patent Application DE 10 2004 043821.8, filed Sep. 10, 2004. This German Patent Application, whose subject matter is incorporated here by reference, provides the basis for a claim of priority of invention under 35 U.S.C. 119 (a)-(d).

BACKGROUND OF THE INVENTION

The invention relates to a device for locking a power tool to a battery pack, and also relates to a battery pack.

Known locking devices for locking cordless power tools, such as handheld power drills, drill hammers, and the like, to a battery pack serving to supply current to them, have one or more locking bars in most cases, which are each supported movably, counter to the force of a spring, in a housing of the power tool and are brought by the spring force into engagement with a detent recess in the battery pack when the battery pack is thrust into a guide of the power tool, in order to connect the battery pack to the power tool. For undoing the connection, the housing of the power tool is equipped with an unlocking device, which is typically located, in the form of a push button, in the vicinity of the guide and is actuated by hand in order to disengage the locking bar from the detent recess.

In another known locking device, which makes so-called one-handed operation of the battery pack possible, the locking bars and the springs that act on the locking bars are integrated, together with two unlocking buttons serving to release the battery pack, with the battery pack, so that when the battery pack is released, the power tool can be firmly held with one hand while the battery pack is grasped with the other hand, the two locking bars are disengaged by finger pressure or thumb pressure on the unlocking buttons from the detent recesses that are recessed out of the housing of the power tool, and the battery pack can then be pulled out of the guide of the power tool. This kind of one-handed operation is indeed sought, but it has the disadvantage that the production costs for the battery pack are higher because of the integration of the locking bars, springs and unlocking devices, and because of the requirement for higher-precision tolerances. Nevertheless, the battery pack should be as inexpensive as possible, since most customers consider the battery pack, unlike the power tool, to be a disposable item that has to be replaced after a certain time in use. The readiness to buy a new battery pack is all the greater, the more inexpensively the battery pack can be procured. Moreover, because of the integration of the locking bars, springs and unlocking devices with the battery pack, the requisite installation space and the weight of the battery pack are increased, which is also seen as a disadvantage.

SUMMARY OF THE INVENTION

Accordingly, it is an object of the present invention to provide a locking device for a power tool to a battery pack, and a battery pack, which avoids the disadvantages of the prior art.

When the device and the battery pack are designed in accordance with the present invention, they provide the advantage above all that, despite the possibility of convenient one-handed operation, the production costs of the battery pack can be reduced not inconsiderably in comparison to those for battery packs having the last-mentioned locking device above, since now only the unlocking device or unlocking devices themselves have to be mounted on the battery pack, while the spring-loaded locking bar or locking bars are located in the housing of the power tool, and accordingly the tolerances that must be adhered to for the battery pack can be greater.

Shifting the spring-loaded locking bar or locking bars into the housing of the power tool can further reduce both the installation space required and the weight of the battery pack, and the unlocking device or devices can be integrated with the plastic housing of the battery pack in a simple, inexpensive embodiment. Moreover, by the combination of characteristics according to the invention, it can be reliably prevented that the battery pack will be released unintentionally from the power tool if an unlocking device is damaged, worn or missing. Compared with the restoring action of an unlocking device integrated along with the locking bar in the battery pack, it is possible, last but not least, for the restoring action of an unlocking device integrated with the battery pack without a locking bar to be considerably less, since the unlocking device needs to assure only its own restoration.

This restoring action of the unlocking device is preferably obtained by means of an elastically deformable element, which upon a manual actuation of the unlocking device is deformed for disengaging the locking bar, and whose elastic restoring force moves the unlocking device back into its unactuated outset position. The elastically deformable element may expediently comprise an elastomer material, which is embodied for example in the form of a soft film of thermoplastic elastomer (TPE) and connects an unlocking button of the unlocking device, which button is accessible from the outside of the battery pack, to a housing of the battery pack in a dustproof and movable manner.

Alternatively, however, the elastically deformable element may also comprise a tongue of elastically deformable plastic material, which is selectively integrated with a housing of the battery pack and acts on the unlocking button, or is integrated with the unlocking button and acts on a housing of the battery pack, and which upon actuation of the unlocking button is elastically deformed and when the unlocking button is released effects the restoration of the unlocking button to the outset position. In principle, it is even conceivable to use the spring, which acts on the locking bar and presses the locking bar into the detent recess, as the elastically deformable element; in that case, however, the restoration of the unlocking button by the locking bar engaging the detent recess does not occur until upon locking of the battery pack to the power tool.

In a further preferred feature of the invention, the unlocking device has a contact-pressure face, which can be pressed against the locking bar, and preferably against its free face end engaging the detent recess, in order to move the locking bar out of the detent recess so far that the contact-pressure face is located between two diametrically opposed, preferably flat guide faces of the battery pack and of the power tool, or is aligned with one of these guide faces, so that the battery pack together with the unlocking device can be displaced along these guide faces for the sake of being released from the power tool.

To prevent the contact-pressure face of the unlocking device, upon the actuation of the latter, for moving past the plane of the guide faces, a stop for the locking bar or for the unlocking device is preferably provided.

A further preferred feature of the invention provides that the unlocking device is accessible from the outside of the battery pack and can be moved preferably transversely to the insertion direction and in the direction of motion of the locking bar into the detent recess, in order to put the contact-pressure face into contact with the free face end of the locking bar that engages the detent recess and then to press the locking bar out of the detent recess, until the contact-pressure face and the tip, contacting it, of the locking bar are located between the diametrically opposed guide faces or are aligned with one of these faces.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
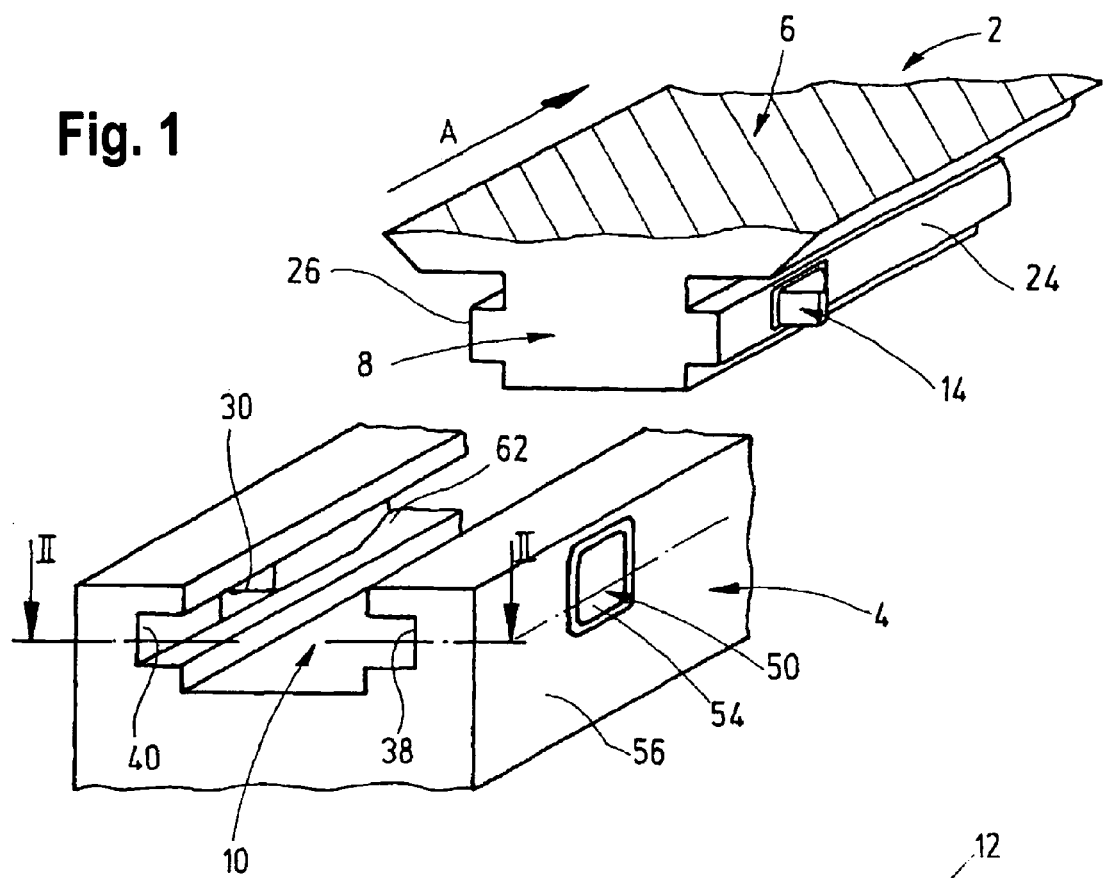
FIG. 1 is a fragmentary cutaway perspective view of a connection between a power tool and a battery pack, having a locking device according to the invention.

The locking device shown in the drawing serves the purpose of mutually locking a cordless power tool 2, such as a handheld drill hammer, and a battery pack 4 required for supplying current to the power tool 2.

As best shown in FIG. 1, the power tool 2, in a known manner, has a protruding guide rail 8 on the free lower end of its handle 6, which guide rail can be inserted in the direction of the arrow A into a guide groove 10, recessed out of the upper end of the battery pack 4, that has a cross section complementary to the cross section of the guide rail 8. The insertion motion of the guide rail 8 into the guide groove 10 is limited by cooperating stops (not shown), which contact one another when the battery pack 4 is properly locked to the power tool 2 and an electrical connection is made between connection contacts of a current-storing means of the battery pack 4 and a current circuit of a consumer of the power tool 2.

Figure 2:
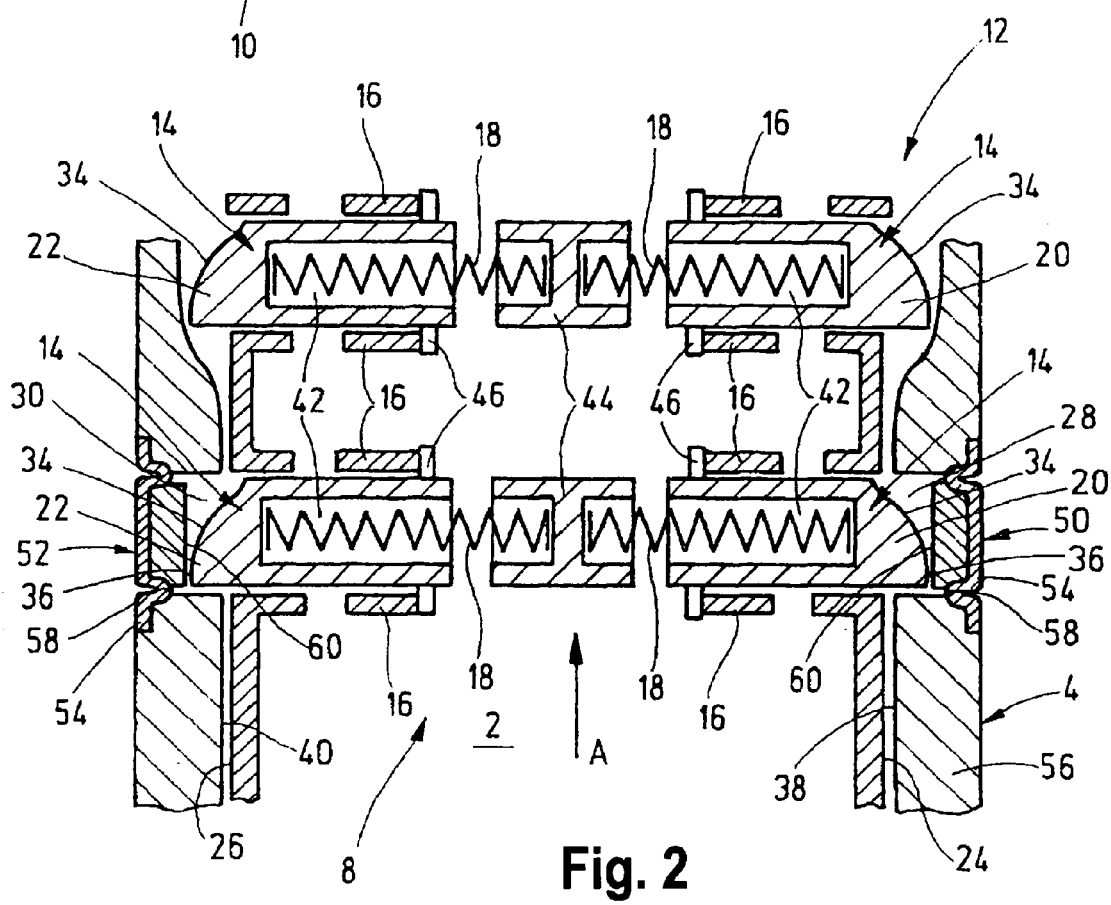
FIG. 2 is a sectional view of the locking device along the plane II-II of FIG. 1, after the power tool and the battery pack have been locked.

The locking device 12 serving to lock the battery pack 4 to the power tool 2 here includes a total of four locking bars 14, which are located in pairs, one behind the other, in the insertion direction of the battery pack 4 in associated locking bar guides 16 in the interior of the guide rail 8. Two each of the locking bars 14 have aligned longitudinal axes and are forced apart to opposite sides transversely to the insertion direction (arrow A), each by a respective helical compression spring 18, so that their outward-pointing free face ends 20, 22 protrude past adjacent lateral guide faces 24, 26 of the guide rail 8. Once the battery pack 4 is locked to the power tool 2, the face ends 20, 22 of one pair of locking bars engages diametrically opposed detent recesses 28, 30 (FIG. 2) located in the interior of the guide groove 10 of the battery pack 4.

The locking device 12 is designed for so-called two-stage locking, in which in a first stage assures the snapping of the locking bars 14, of the front pair of locking bars in the insertion direction, into the detent recesses 28, 30 such that the battery pack 4 is secured against unintentional release relative to the handle 6 of the power tool 2, for instance for shipping, but no electrical connection is yet made between the connection contacts of the current-storing means of the battery pack 4 and the current circuit of the consumer of the power tool 2. This connection is not made until the battery pack 4, in the second stage, is inserted farther until it reaches the terminal position shown in FIG. 2, in which the locking bars 14 of the rear pair of locking bars, in the insertion direction, snap into the detent recesses 28, 30 and assure a final locking of the battery pack 4 relative to the power tool 2 while simultaneously making an electrical connection (not shown) between them.

The free face ends 20, 22 of the locking bars 14 have run-up chamfers 34, which point in the insertion direction and assure that all the locking bars 14, when the battery pack 4 is slipped onto the guide rail 8 of the power tool 2 and the front locking bars 14, on passing the detent recesses 28, 30, are automatically displaced inward in their guides 16, counter to the force of the spring 18, until their tips 36 are aligned with the guide faces 24, 26. These guide faces extend parallel to diametrically opposed side faces 38, 40 of the guide groove 10 and have a slight spacing from them.

The locking bars 14 are provided in the interior with a cylindrical hollow chamber 42 for the associated helical compression spring 18, which is braced by its outward-pointing face end against the bottom of the hollow chamber 42 and by its inward-pointing face end against a stationary abutment 44 in the interior of the guide rail 8. The spacings between the inward-pointing face ends of the locking bars 14 and the adjacent, outward-pointing face ends of the abutments 44 are dimensioned such that the locking bars 14 strike the abutments 44 when their tips 36 are aligned with the guide faces 24, 26 (see FIG. 3). On their rear face ends, the locking bars 14 have laterally protruding lugs 46, which cooperate with the locking bar guide 16 and limit the outward path of motion of the locking bars 14, to prevent the locking bars 14 from falling out when the battery pack 4 is removed.

The two detent recesses 28, 30, located diametrically opposite one another in the interior of the guide groove 10, extend as far as the adjacent outside of a housing 56 of the battery pack 4 and open in the interior into the two diametrically opposed side faces 38, 40 of the guide groove 10. Each of the detent recesses 28, 30 accommodates an unlocking button 50, 52, which is accessible or actuatable from the outside of the housing 56 and is displaceable inside the detent recess 28, 30 transversely to the insertion direction, so that the locking bars 14, of each pair of locking bars, engaging the detent recesses 28, 30 can be manually disengaged from the two recesses 28, 30 by means of a finger or thumb pressure exerted simultaneously on both buttons 50, 52, in order first to unlock the battery pack 4 and then release it from the power tool 2.

Each of the two unlocking buttons 50, 52 is joined in dustproof fashion to the surrounding edge of the detent recess 28, 30, on the outside of the housing 56, by a soft film 54 that is square in outline and is made of an elastomer material, such as a thermoplastic elastomer (TPE). The soft film 54 is glued or welded in its middle to the outside of the button 50, 52, while its peripheral edge is glued or welded to the edge of the housing 56 surrounding the detent recess 28, 30. In the undeformed state (FIG. 2), the film 54 has an inward-protruding bead 58, which protrudes into an indentation that extends around the buttons 50, 52 and is defined by diametrically opposed shoulders of the button 50, 52 and of the housing 56. In the region of the bead 58, the film 54 is reversibly elastically deformable, so that the unlocking buttons 50, 52, with deformation of the bead 56, can be pressed inward into the detent recesses 28, 30 and, because of the elastic restoring forces of the deformed film 54, can automatically return to their outset position shown in FIG. 2, even if no locking bar 14 is pressing from the inside against the respective button 50, 52.

Figure 3:
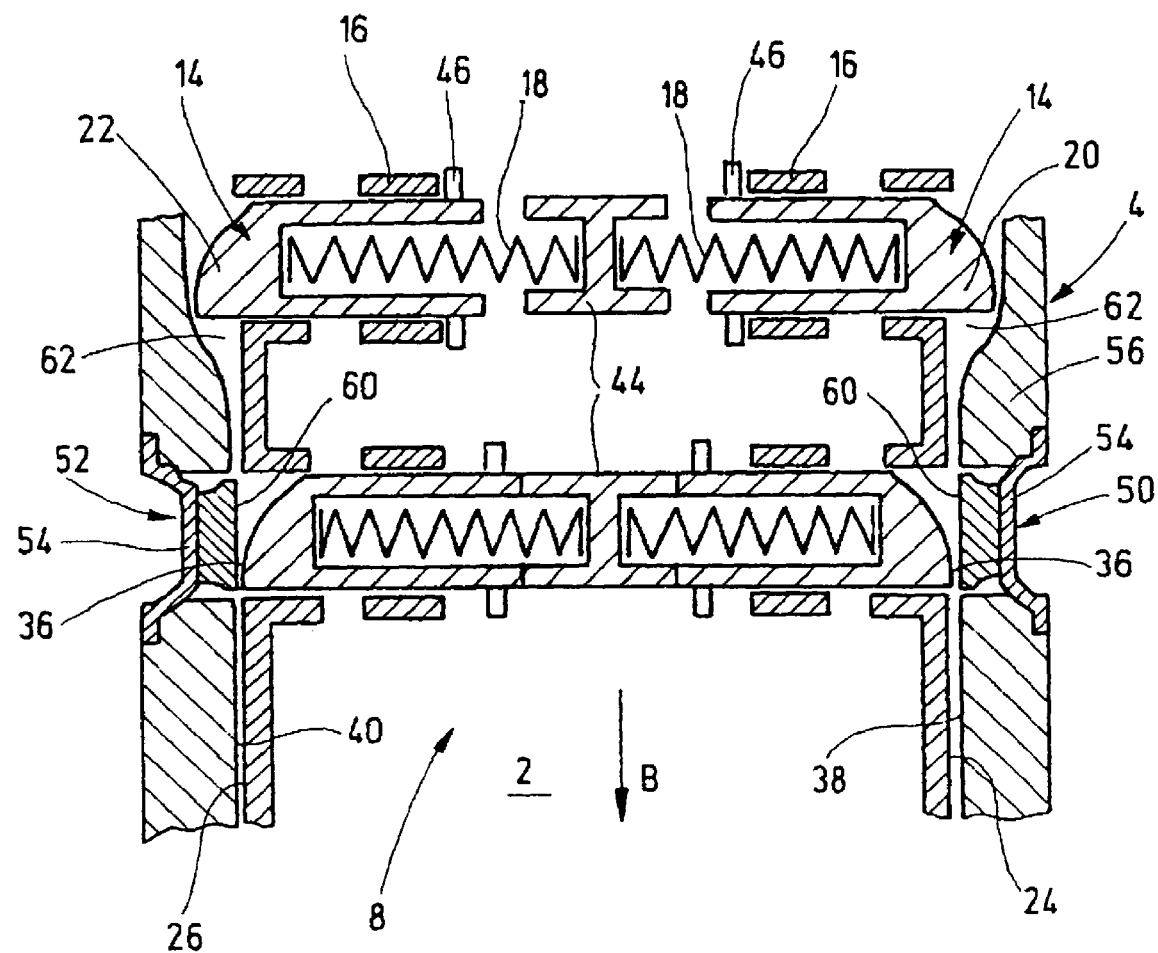
FIG. 3 is a view corresponding to FIG. 2, but upon actuation of two unlocking buttons of the locking device.

On their inside, the unlocking buttons 50, 52 have a flat contact-pressure face 60, which is diametrically opposite the free face end 20, 22 of the locking bar 14. Upon an actuation of the unlocking buttons 50, 52, the contact-pressure face 60 is pressed against the tip 36 of the adjacent locking bar 14 and, for disengaging its face end 20, 22 from the detent recess 28, 30, displaces the locking bar inward in the locking bar guide 16, counter to the force of the spring 18, until the locking bar 14 strikes the abutment 44, as shown in FIG. 3. In this position, the contact-pressure faces 60 are aligned with the adjacent side faces 38, 40 of the guide groove 10, and the tip 36 of the locking bar 14 is aligned with the guide faces 24, 26 of the guide rail 8, so that the battery pack 4 can be pulled off the power tool 2 in the direction of the arrow B.

Besides the detent recesses 28, 30, the side faces 38, 40 each have one further recess 62, which is located behind the detent recesses 28, 30 in terms of the insertion direction and which is engaged by the locking bars 14 of the front pair of locking bars, for relieving their compression springs 18 without locking, once the battery pack 4, in the second stage, is locked in final fashion to the power tool 2.

The term "battery pack" 4 as used within the scope of this application is meant to refer primarily to a pack of rechargeable current-storing means (accumulators), but also to a pack of disposable current-storing means (batteries). Moreover, instead of the geometry shown in the drawing for the connection between the battery pack 4 and the power tool 2, some other geometry may be employed, such as a shaft in the power tool 2, into which the battery pack 4 is thrust partway. Moreover, the described locking device 12 is suitable not only for locking battery packs 4 to power tools 2 but also for locking them to arbitrary other cordless electrical devices.

It will be understood that each of the elements described above, or two or more together, may also find a useful application in other types of constructions differing from the types described above.

While the invention has been illustrated and described as embodied in a device for locking a power tool to a battery pack, and battery pack, it is not intended to be limited to the details shown, since various modifications and structural changes may be made without departing in any way from the spirit of the present invention.

Without further analysis, the foregoing will so fully reveal the gist of reveal present invention that others can, by applying current knowledge, readily adapt it for various applications without omitting features that, from the standpoint of prior art, fairly constitute essential characteristics of the generic or specific aspects of the invention.

What is claimed as new and desired to be protected by Letters Patent is set forth in the appended claims:

1. A device for locking a power tool to a battery pack, comprising at least one movable locking bar mountable on the power tool and upon locking engaging a detent recess of the battery pack; and at least one unlocking device for manually disengaging said locking bar from said detent recess, said unlocking device being mountable on said battery pack and acting on said locking bar of said power tool.

2. A device as defined in claim 1, wherein said unlocking device has a contact-pressure face which upon disengagement of said locking bar is pressed against said locking bar and with said locking bar disengaged is located between two diametrically opposed guide faces of the battery pack.

3. A device as defined in claim 1, wherein said unlocking device has a contact-pressure face which upon disengagement of said locking bar is pressed against said locking bar and with said rocking bar disengaged is aligned with one of two diametrically opposed guide faces of the battery pack.

4. A device as defined in claim 1, wherein said unlocking device has an unlocking button which is movable in the detent recess.

5. A device in claim 1, wherein said unlocking device has an unlocking button which is diametrically opposite a part of said locking bar that engages said detent recess.

6. A device as defined in claim 1; and further comprising an elastically deformable element which upon a manual actuation of said unlocking device for disengaging said locking bar is elastically deformed and which has a restoring force moving said unlocking device back into an outset position.

7. A device as defined in claim 6, wherein said elastically deformable element has an elastomer material and connects said unlocking device to a housing of the battery pack.

8. A device as defined in claim 6, wherein elastically deformable element has an elastically deformable plastic material and is integrated with a housing of the battery pack and acts on said unlocking device.

9. A device as defined in claim 5, wherein said elastically deformable element has an elastically deformable plastic material and is integrated with said unlocking device and acts on a housing of the battery pack.

10. A battery pack for locking to a power tool, comprising at least one detent recess which is engaged upon locking by a movable locking bar of the power tool; and an unlocking device mounted on the battery pack for manually disengaging said looking bar from said detent recess, said unlocking device being mounted on the battery pack and acting on said locking bar of said power tool.

11. A power tool system, comprising a power tool having a movable locking bar, a battery pack provided for said power tool and having at least one detent recess configured so that upon locking said at least one detent recess is engaged by said movable locking bar of said power tool; and at least one unlocking device mounted on said battery pack for manually disengaging said locking bar from said detent recess, said at least one unlocking device being mounted on said battery pack and acting on said locking bar of said power tool.

* * * * *